United States Patent
Backenstoes

(10) Patent No.: US 11,557,885 B2
(45) Date of Patent: Jan. 17, 2023

(54) METHOD AND APPARATUS FOR REMOVING INSULATION FROM A CABLE

(71) Applicant: TE Connectivity Services GmbH, Schaffhausen (CH)

(72) Inventor: Thomas E Backenstoes, Harrisburg, PA (US)

(73) Assignee: TE Connectivity Solutions GmbH

( * ) Notice: Subject to any disclaimer, the term of this patent is extended or adjusted under 35 U.S.C. 154(b) by 0 days.

(21) Appl. No.: 17/065,237

(22) Filed: Oct. 7, 2020

(65) Prior Publication Data

US 2021/0119426 A1    Apr. 22, 2021

Related U.S. Application Data

(60) Provisional application No. 62/924,402, filed on Oct. 22, 2019.

(51) Int. Cl.
    *H02G 1/12*    (2006.01)

(52) U.S. Cl.
    CPC ................................ *H02G 1/1265* (2013.01)

(58) Field of Classification Search
    CPC ..... Y10T 83/04; Y10T 83/05; Y10T 83/0363; Y10T 83/0378; Y10T 83/037; H02G 1/1265; H02G 1/1248; H02G 1/12; H02G 1/1202; H02G 1/1253; H02G 1/1256
    USPC ........ 30/90.1, 90.2, 90.3, 90.8, 90.9; 81/9.4, 81/9.51, 9.41, 9.42
    See application file for complete search history.

(56) References Cited

U.S. PATENT DOCUMENTS

| | | | |
|---|---|---|---|
| 4,951,530 A * | 8/1990 | Cross | H02G 1/1265 81/9.42 |
| 4,972,582 A * | 11/1990 | Butler | H02G 1/127 30/90.1 |
| 4,993,147 A | 2/1991 | Carpenter | |
| 5,010,797 A | 4/1991 | Stepan | |
| 7,013,782 B2 | 3/2006 | Palmowski | |
| 7,597,030 B2 * | 10/2009 | Stepan | H02G 1/1265 81/9.42 |
| 10,833,493 B2 * | 11/2020 | Messina | H02G 1/1297 |

FOREIGN PATENT DOCUMENTS

KR    20090012235 U    4/1991

OTHER PUBLICATIONS

International Search Report, International Application No. PCT/IB2020/059946 dated Oct. 22, 2020.

* cited by examiner

*Primary Examiner* — Phong H Nguyen

(57) ABSTRACT

A method of removing insulation from an electrical cable. The method includes: moving a cutting surface of the insulation cutting blade in a rotary direction relative to the insulation of the cable; cutting the insulation to a defined depth with the cutting surface of the insulation cutting blade as the insulation cutting blade is moved in the rotary direction, the defined depth being less than the thickness of the insulation; moving the cutting surface of insulation cutting blade in a radial direction relative to the insulation of the cable; and cutting the insulation from the defined depth with the cutting surface of the insulation cutting blade as the insulation cutting blade is moved in the radial direction. The entire thickness of the insulation is cut by the combination of the movement of the insulation cutting blade in the rotary direction and in the radial direction.

18 Claims, 7 Drawing Sheets

METHOD AND APPARATUS FOR REMOVING INSULATION FROM A CABLE

FIELD OF THE INVENTION

The present invention is directed to a method and apparatus for removing insulation from a cable. In particular, the invention is directed to a method and apparatus to remove cut resistant insulation from a cable without damaging the other components of the cable.

BACKGROUND OF THE INVENTION

Certain cable types, such as those used for electric and hybrid vehicles, require several different process steps to prepare them for termination. These process steps include the need to remove insulation, such as silicone, from the outside of the cable and also from the outside of the center conductor. Currently available commercial processes for removing this insulation may nick or cut braid or conductor strands during the removal process, which is unacceptable to certain end users. One process that reduces damage involves using a pair of linear-acting contour blades. When fully closed, these blades produce a circle that closely matches the diameter of the layer beneath the insulation. These blades, however, can produce damage on the sides of the cables where there is a slicing action.

Another process that is used to reduce damage is to force the cutting edge through the insulation in a radial, or near radial direction. The limitation of using a radial ("pressing") motion to cut silicone rubber, or similar materials, is that such materials are designed to be abrasion and cut resistant. Applying the radial motion to the cutting blade, against the surface of the insulation material, results in a temporary compression of the insulation material in the immediate blade contact area. After removing the force applied to the blade, the insulation is left intact without being cut.

There is a need for a method and apparatus for stripping the insulation from the cable which is effective in removing the insulation without damaging the other components of the cable, such as the braid strands or conductor strands.

SUMMARY OF THE INVENTION

An embodiment is directed to a method a method of removing insulation from an electrical cable. The method includes: positioning the cable proximate an insulation cutting blade of a cable preparation apparatus; moving a cutting surface of the insulation cutting blade in a rotary direction relative to the insulation of the cable; engaging the insulation with the cutting surface of the insulation cutting blade as the insulation cutting blade is moved in the rotary direction; cutting the insulation to a defined depth with the cutting surface of the insulation cutting blade as the insulation cutting blade is moved in the rotary direction, the defined depth being less than the thickness of the insulation; thereafter, moving the cutting surface of insulation cutting blade in a radial direction relative to the insulation of the cable; engaging the insulation with the cutting surface of the insulation cutting blade as the insulation cutting blade is moved in the radial direction; and cutting the insulation from the defined depth with the cutting surface of the insulation cutting blade as the insulation cutting blade is moved in the radial direction. The entire thickness of the insulation is cut by the sequential combination of the movement of the insulation cutting blade in the rotary direction and the movement of the insulation cutting blade in the radial direction.

An embodiment is directed to a method of removing insulation from an electrical cable. The method includes: positioning the cable between insulation cutting blades of a cable stripping or preparation apparatus; cutting the insulation to a defined depth with cutting surfaces of the insulation cutting blades as the insulation cutting blades are moved in a rotary direction relative to the insulation of the cable, the defined depth being less than the thickness of the insulation; maintaining the insulation cutting blades in the insulation to displace insulation material, creating tension in the insulation in areas directly beneath the blade cutting surfaces of the insulation cutting blades; and cutting the insulation from the defined depth with the cutting surfaces of the insulation cutting blades as the insulation cutting blades are moved in the radial direction. The entire thickness of the insulation is cut by the combination of the movement of the insulation cutting blades in the rotary direction and the movement of the insulation cutting blades in the radial direction.

An embodiment is directed to an apparatus for cable stripping and preparation. The apparatus includes a first drive mechanism and a second drive mechanism which is spaced from and in line with the first drive mechanism. Blade control arms with cutting blades are movably mounted relative to the first drive mechanism and the second drive mechanism. The first drive mechanism moves the insulation cutting blades from a first position to a second position. The second drive mechanism rotates the insulation cutting blades when the insulation cutting blades are in the second position.

Other features and advantages of the present invention will be apparent from the following more detailed description of the illustrative embodiment, taken in conjunction with the accompanying drawings which illustrate, by way of example, the principles of the invention.

DETAILED DESCRIPTION OF THE INVENTION

Figure 1:
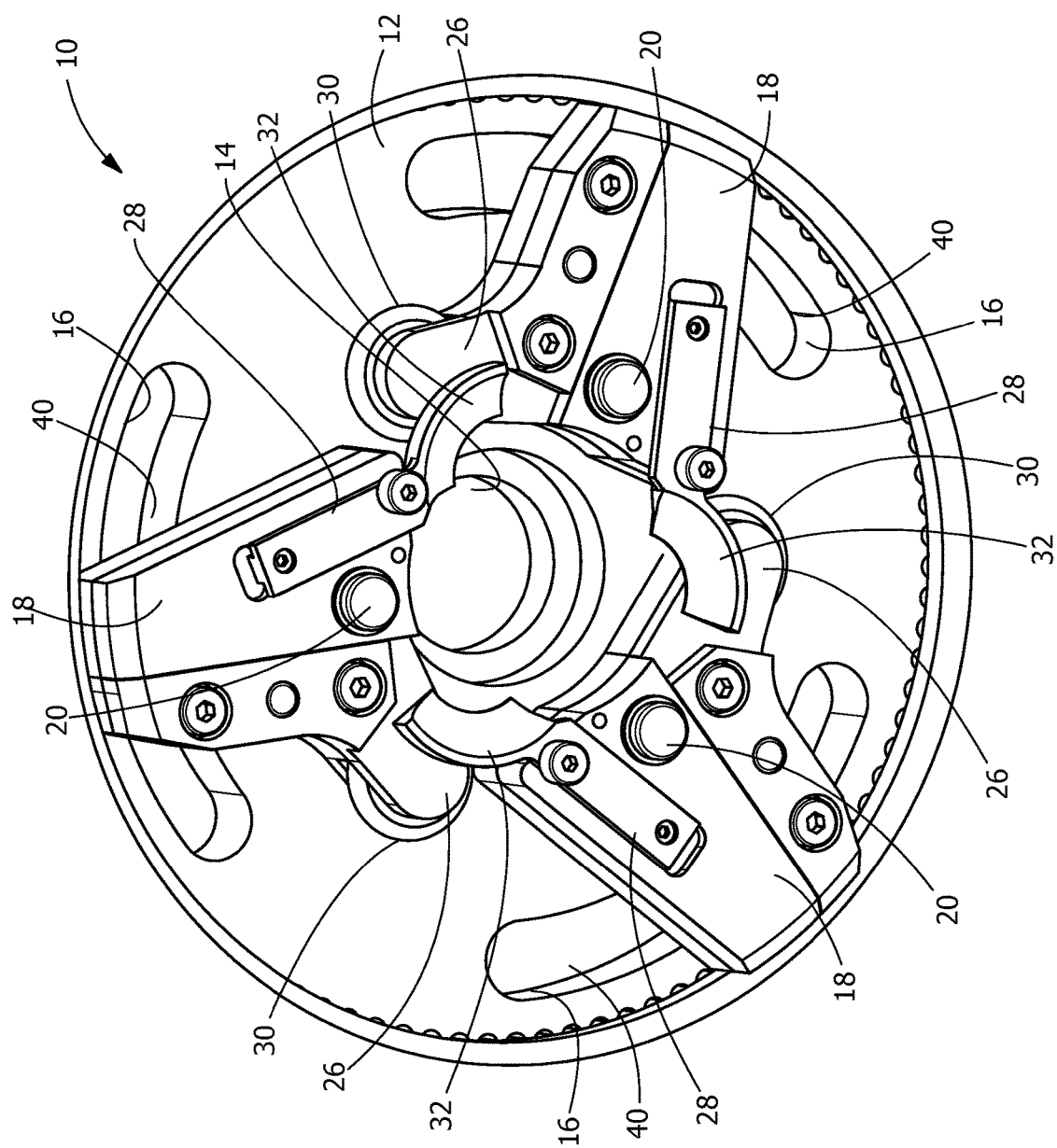
FIG. 1 is a perspective front view of an illustrative cable preparation apparatus according to the present invention.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

As shown in FIG. 1, a cable stripping or preparation apparatus 10 has circular base 12 which has a center opening 14 and arcuate slots 16 positioned proximate the circumference of the circular base 12. In the illustrative embodiment shown, three arcuate slots 16 are provided.

Blade control arms 18 are mounted on the base 12. Mounting members 20 extend through the blade control arms 18 to the base 12. The mounting members 20 pivotally mount the blade control arms 18 to the base 12 to allow the blade control arms 18 to move or pivot relative to the base 12. Each blade control arm 18 has a wheel mounting device (not shown) which extends through the respective slot 16 to mount to a drive wheel mechanism 40. The movement of the drive wheel mechanism 40 causes the blade control arms 18 to pivot about mounting members 20.

Each blade control arm 18 has a round wheel or braid cutting wheel mounting portion 26 and a contoured or insulation cutting blade mounting portion 28. As shown in FIG. 1, a round wheel or braid cutting wheel 30 is mounted in the round wheel mounting portion 26 and a contoured or insulation cutting blade 32 is mounted in the contoured blade mounting portion 28. The braid cutting wheel 30 is mounted to allow the braid cutting wheel 30 to spin or rotate relative to the round wheel mounting portion 26. The insulation cutting blade 32 is fixedly mounted to the contoured blade mounting portion 28. Each of the insulation cutting blades 32 has an arcuate cutting surface 34, the radius of which may approximate the radius of the cable. Although three insulation cutting blades 32 are shown, other number of cutting blades may be used.

Figure 2:
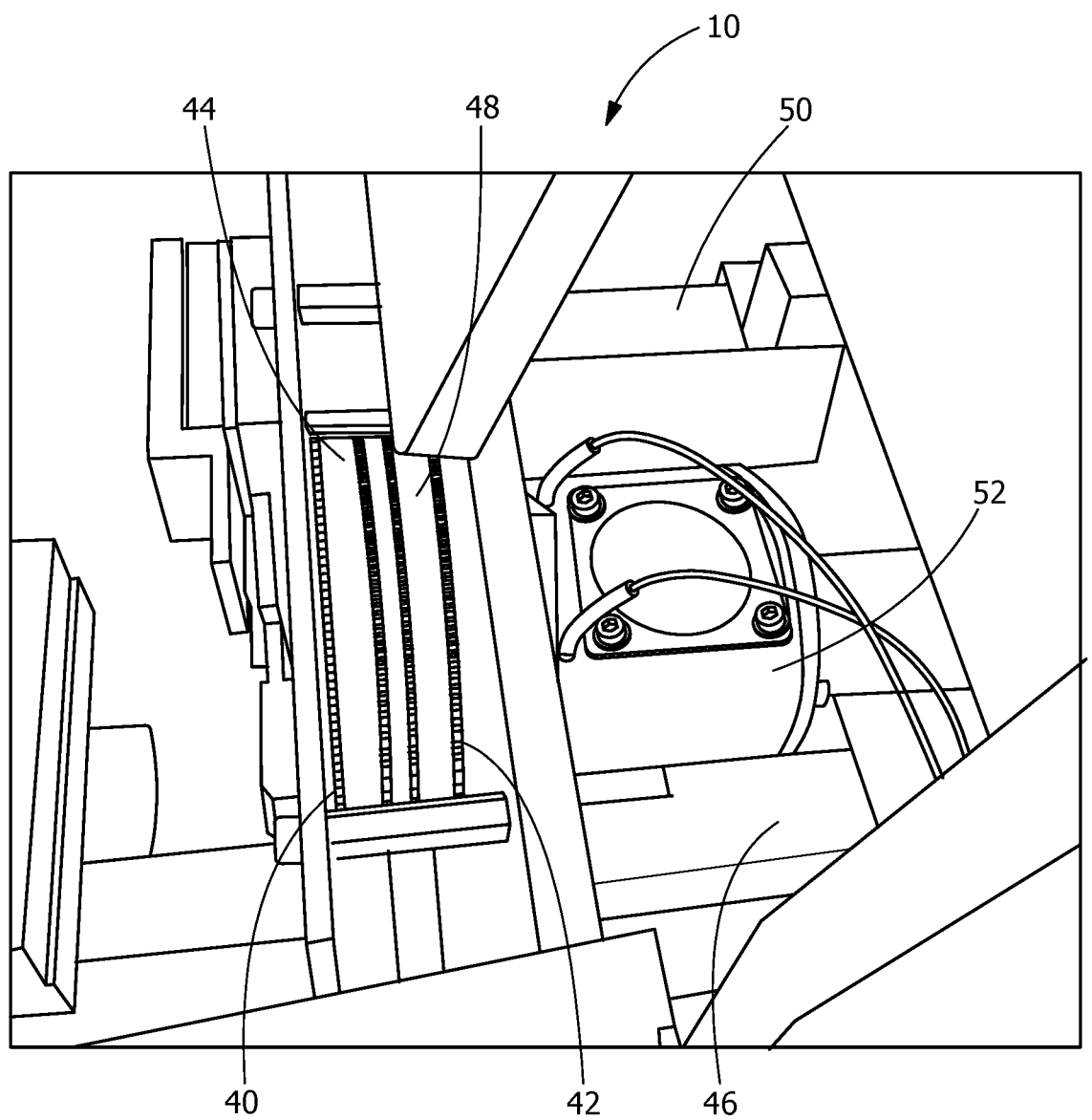
FIG. 2 is a perspective side view of the cable preparation apparatus of FIG. 1.

Referring to FIG. 2, cable preparation apparatus 10 has a first drive wheel mechanism 40 and a second drive wheel mechanism 42 which is spaced from but in line with the first drive wheel mechanism 40. A front or first pulley 44 cooperates with the first drive wheel mechanism 40. The first pulley 44 extends between the first drive wheel mechanism 40 and a front or first drive motor 46. The first drive motor 46 may be, but is not limited to, a servo motor. A back or second pulley 48 cooperates with the second drive wheel mechanism 42. The second pulley 48 extends between the second drive wheel mechanism 42 and a back or second drive motor 50. The second drive motor 50 may be, but is not limited to, a servo motor. A scrap tube 52 extends from the back of the cable preparation apparatus 10.

The cable stripping or preparation apparatus 10 is just one illustrative embodiment on which the insulation cutting blades 32 can be provided. However, the method as described below can be used with the illustrative cable stripping or preparation apparatus 10 or other types of cable stripping or preparation apparatuses. In addition, the shape of the insulation cutting blade 32 may vary from the description above without effecting the scope of the method.

In use, the user or operator places an electrical cable 60 between the insulation cutting blades 32 of the cable stripping or preparation apparatus 10. With the cable 60 properly positioned, the apparatus 10 is activated.

Figure 5:
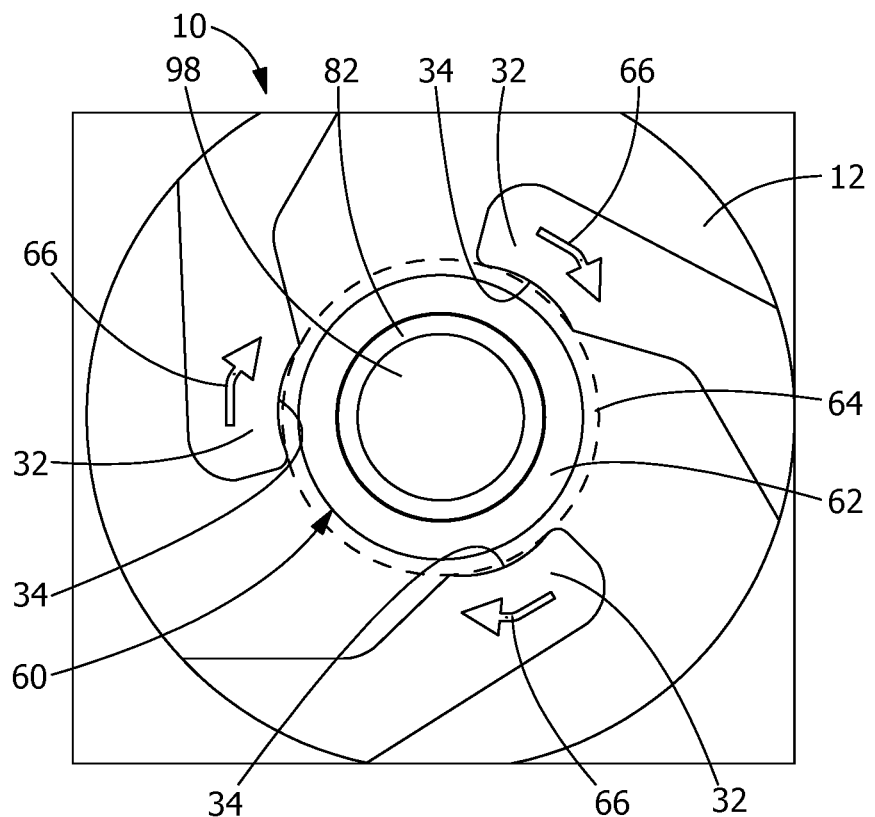
FIG. 5 is a diagrammatic view of the of insulation cutting blades prior to engaging the cable, the arrows indicated the rotational motion of the insulation cutting blades.

The insulation cutting blades 32 are initially moved to a first position proximate the outer insulation 62 of the cable 60, as shown by dotted line 64 in FIG. 5. The insulation cutting blades 32 are moved to the first position by the first drive wheel mechanism 40. In the first position the insulation cutting blades 32 are positioned proximate to, but do not engage the outer insulation 62.

Figure 6:
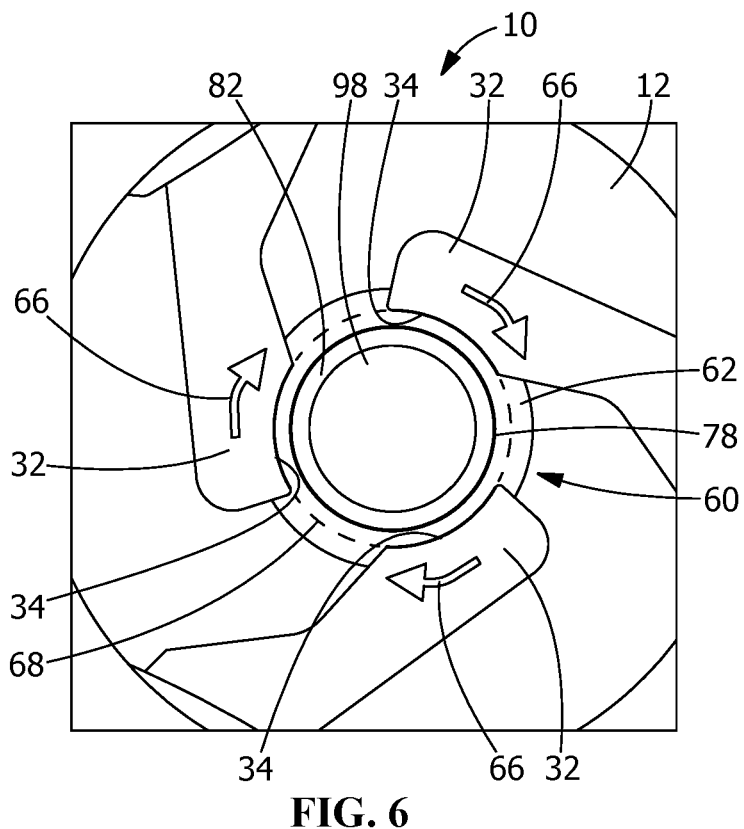
FIG. 6 is a diagrammatic view of the of insulation cutting blades shown partially cutting through the material of the outer insulation, the arrows indicated the rotational motion of the insulation cutting blades.

With the insulation cutting blades 32 properly positioned in the first position, the insulation cutting blades 32 are spun or rotated in the direction of the arrows 66 shown in FIGS. 5 and 6. While the motion of the cutting blades 32 is shown by arrows 66, other motions of the cutting blades 32 may be used, such as, but not limited to, moving in the opposite direction or moving in a linear direction tangential to the insulation.

The insulation cutting blades 32 are moved from the first position to the second position by the first drive wheel mechanism 40. The insulation cutting blades 32 are rotated by the second drive wheel mechanism 42. As the blades 32 are rotated about the longitudinal axis of the cable 60, the arcuate cutting surface 34 of the blades 32 are moved from the first position toward the center of the cable 60 until a programed, precise second position, as shown by the dotted line 68 in FIG. 6, is reached. As this occurs, the arcuate cutting surfaces 34 of the blades 32 move in a rotary or tangential direction relative to the outer insulation 62 of the cable 60 which allows the arcuate cutting surface 34 of the blades 32 to slice into the outer insulation 62.

As the blades 32 are moved from the first position to the second position, the blades 32 spin around the circumference of the cable 60, while being driven to a precise depth that partially cuts the outer insulation 62 without completely cutting through the outer insulation 62. In the second position, the blades 32 have cut through more than one-half of the outer insulation 62. The precise depth of the cut is determined and controlled by the size or gauge of the cable and by controlling the cutting dynamics of the blade 32, such as, but not limited to, rotation rate, closing speed, number of rotations, number of chops, depth of chops to impart tensile stress during the process.

Figure 3:
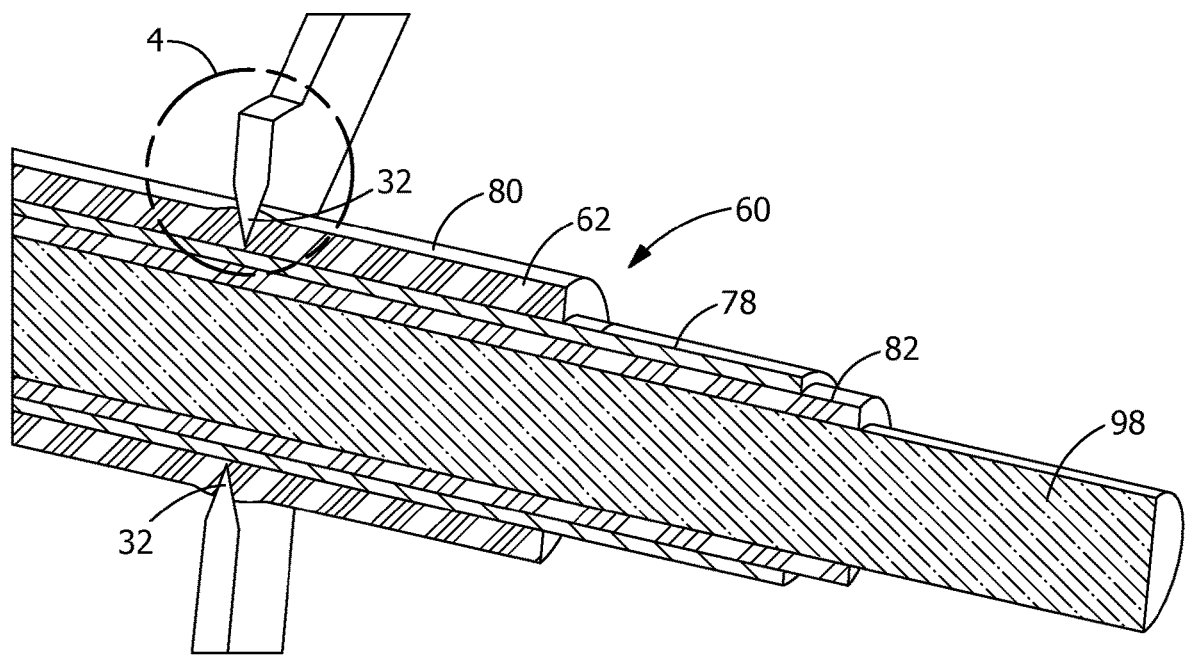
FIG. 3 is a cross-sectional diagrammatic view of a cable with the insulation cutting blades partially cutting through the outer insulation of the cable.
Figure 4:
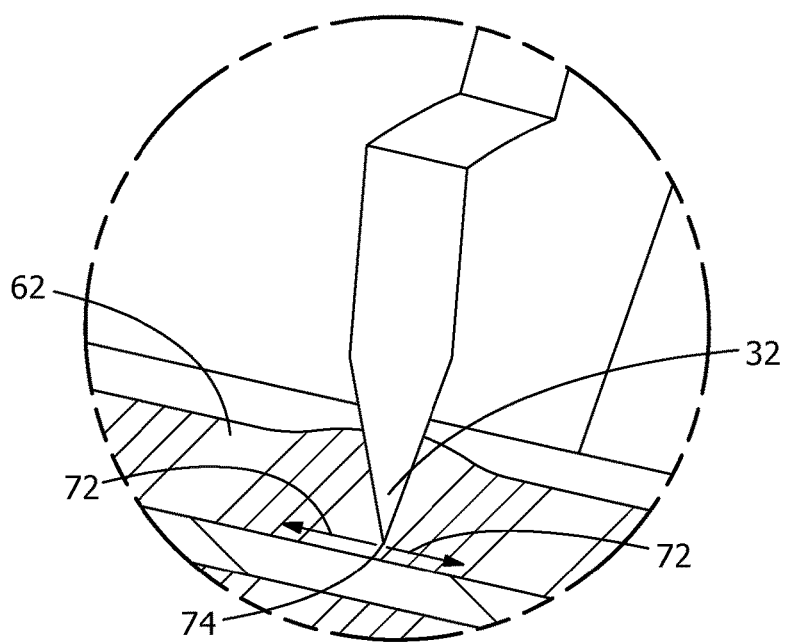
FIG. 4 is an enlarged view of a portion of FIG. 3, showing the displacement of the material of the outer insulation proximate to the insulation cutting blade.

Upon cutting the outer insulation 62 to the precise depth of the second position, the rotation of the blades 32 relative to the cable 60 is stopped. In this position, the blades 32 remain embedded in the outer insulation 62 at the second position depth. As shown in FIGS. 3 and 4, the embedded blade 32 displaces the outer insulation 62, creating tension in the outer insulation 62, as indicated by arrows 72, in the area 74 directly beneath the blade 32 (FIG. 4).

Figure 7:
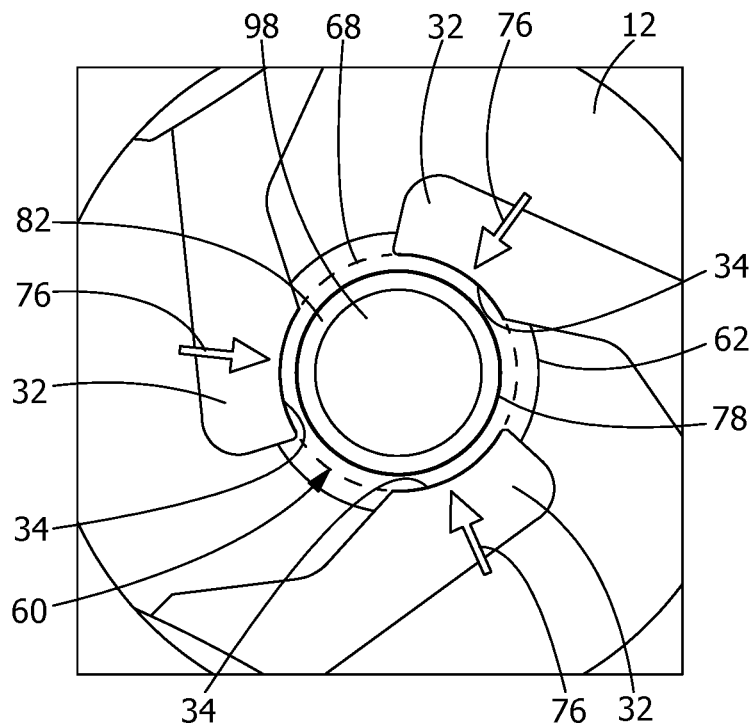
FIG. 7 is a diagrammatic view of the of insulation cutting blades shown partially cutting through the material of the outer insulation, the arrows indicated the radial motion of the insulation cutting blades.
Figure 8:
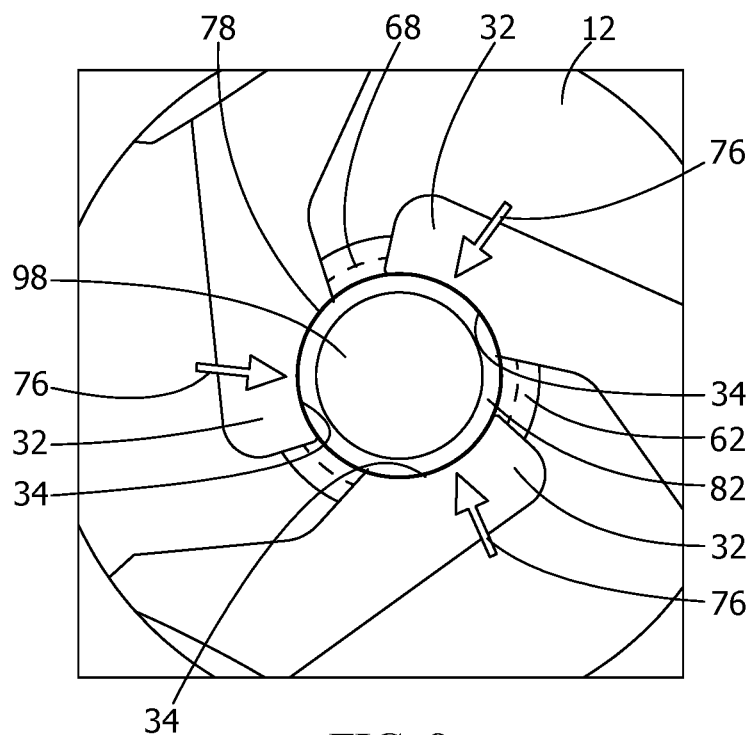
FIG. 8 is a diagrammatic view of the of insulation cutting blades shown fully cut through the material of the outer insulation, the arrows indicated the radial motion of the insulation cutting blades.

The blades 32 are then moved in a radial, or approximately radial, direction, as shown by arrows 76 in FIGS. 7 and 8. The radial movement of the blades 32 causes the blades 32 to move from the second position shown in FIG. 7 to a third position shown in FIG. 8, in which the blades 32 extend through the outer insulation 62. The insulation cutting blades 32 are moved from the second position to the third position by the first drive wheel mechanism 40. The tension created in the outer insulation 62 by the embedded blades 32 ensures that each radial movement or chop will cut the outer insulation 62 in the area 74, rather than only deforming the outer insulation 62. The radial cutting direction and the precise control of the blades 32 ensures that the components of the cable 60 below area 74, such as the braid strands 78 are not cut. A single or multiple radial movement(s) or chop(s) may be used to cut through the outer insulation 62.

After a radial movement or chop, the blades 32 return to the depth of the second position. The insulation cutting blades 32 are moved from the third position to the second position by the first drive wheel mechanism 40. The blades 32 are then rotated by a pre-set amount, for example 30 degrees, before the next radial movement or chop. The insulation cutting blades 32 are rotated by a coordinated movement of the first drive wheel mechanism 40 and the second drive wheel mechanism 42, in order to maintain the cutting blade depth at the second position during the rotation of the cutting blades 32. The movement of the blades 32 ensures that any insulation that was left uncut between the adjacent contour blades 32 is completely cut. The blades 32 are again moved in a radial, or approximately radial, direction, as shown by arrows 76 in FIG. 7. The insulation cutting blades 32 are moved in the radial direction by the first drive wheel mechanism 40. The repeat radial movement of the blades 32 causes the blades 32 to move from the second position shown in FIG. 7 to a third position shown in FIG. 8, in which the blades 32 extend through the outer insulation 62, thereby cutting the insulation 62 of the cable 60. This is repeated until all of the insulation in line with the arcuate cutting surface 34 of the blades 32 along the circumference of the cable 60 is cut.

With the radial movement complete, the arcuate cutting surface 34 of the blades 32 are moved in the radial direction to a predetermined fourth position to prepare for the insulation slug 80 (FIG. 3) removal. The insulation cutting blades 32 are moved from the third position to the fourth position by the first drive wheel mechanism 40. In the fourth position, the blades 32 are spaced from the braid strands 78 while keeping the arcuate cutting surface 34 of the blades 32 engaged with the outer insulation 62. The fourth position may be similar or different than the second position. The cable 60 is then moved in a direction parallel to the longitudinal axis of the cable 60 away from the arcuate cutting surface 34 of the blades 32 so that the blades 32 pull the cut insulation slug 80 from the cable 60. With the insulation slug 80 removed, the insulation cutting blades 32 are opened such that the arcuate cutting surfaces 34 do not engage the cable 60, thereby allowing the cable 60 to be moved relative to the insulation cutting blades 32 and the arcuate cutting surfaces 34 without contacting the arcuate cutting surfaces 34.

After the removal of the insulation slug 80 the insulation blades 32 may also be used to remove the inner insulation 82 from the cable 60. The cable 60 is positioned between the insulation cutting blades 32 of the cable stripping or preparation apparatus 10. With the cable 60 properly positioned, the apparatus 10 is activated.

Figure 9:
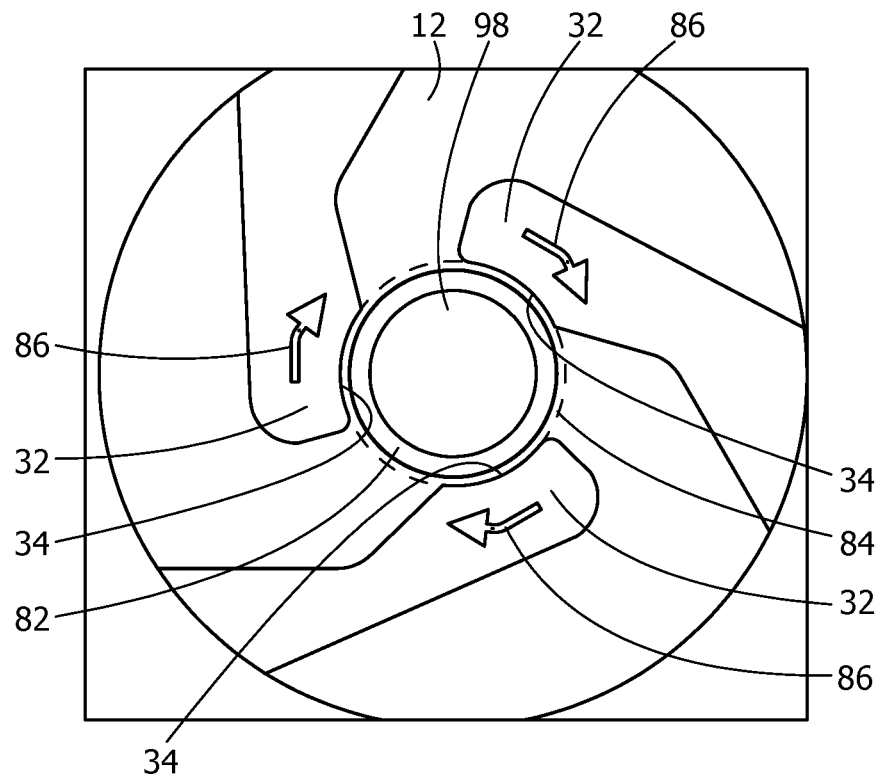
FIG. 9 is a diagrammatic view of the of insulation cutting blades prior to engaging the inner insulation of the cable, the arrows indicated the rotational motion of the insulation cutting blades.

The insulation cutting blades 32 are initially moved to a fifth position proximate the inner insulation 82 of the cable 60, as shown by dotted line 84 in FIG. 9. The insulation cutting blades 32 are moved to the fifth position by the first drive wheel mechanism 40. In the fifth position the insulation cutting blades 32 are positioned proximate to, but do not engage the inner insulation 82.

With the insulation cutting blades 32 properly positioned in the fifth position, the insulation cutting blades 32 are spun or rotated in the direction of the arrows 86 shown in FIG. 9. While the motion of the cutting blades 32 is shown by arrows 86, other motions of the cutting blades 32 may be used, such as, but not limited to, moving in the opposite direction or moving in a linear direction tangential to the insulation.

Figure 10:
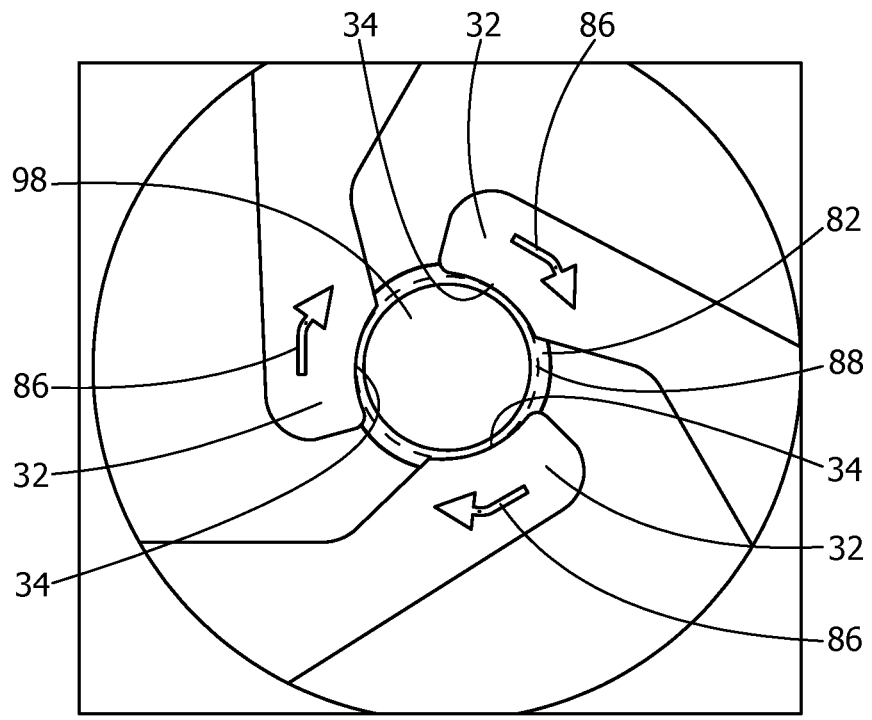
FIG. 10 is a diagrammatic view of the of insulation cutting blades shown partially cutting through the material of the inner insulation, the arrows indicated the rotational motion of the insulation cutting blades.

The insulation cutting blades 32 are moved from the fifth position to the sixth position by the first drive wheel mechanism 40. The insulation cutting blades 32 are rotated by the second drive wheel mechanism 42. As the blades 32 are rotated about the longitudinal axis of the cable 60, the arcuate cutting surface 34 of the blades 32 are moved from the fifth position toward the center of the cable 60 until a programmed, precise sixth position, as shown by the dotted line 88 in FIG. 10, is reached. As this occurs, the arcuate cutting surfaces 34 of the blades 32 move in a rotary or tangential direction relative to the inner insulation 82 of the cable 60 which allows the arcuate cutting surface 34 of the blades 32 to slice through the inner insulation 82.

As the blades 32 are moved from the fifth position to the sixth position, the blades 32 spin around the circumference of the cable 60, while being driven to a precise depth that partially cuts the inner insulation 82 without completely cutting through the inner insulation 82. In the sixth position, the blades 32 have cut through more than one-half of the inner insulation 82. The precise depth of the cut is determined and controlled by the size or gauge of the cable and by controlling the cutting dynamics of the blade 32, such as, but not limited to, rotation rate, closing speed, number of rotations, number of chops, depth of chops to impart tensile stress during the process.

Upon cutting the inner insulation 82 to the precise depth of the sixth position, the rotation of the blades 32 relative to the cable 60 is stopped. In this position, the blades 32 remain embedded in the inner insulation 82 at the second position depth. Similar to that shown in FIGS. 2 and 3, the embedded blade 32 displaces the insulation material, creating tension in the inner insulation 82 in the area directly beneath the blade 32.

Figure 11:
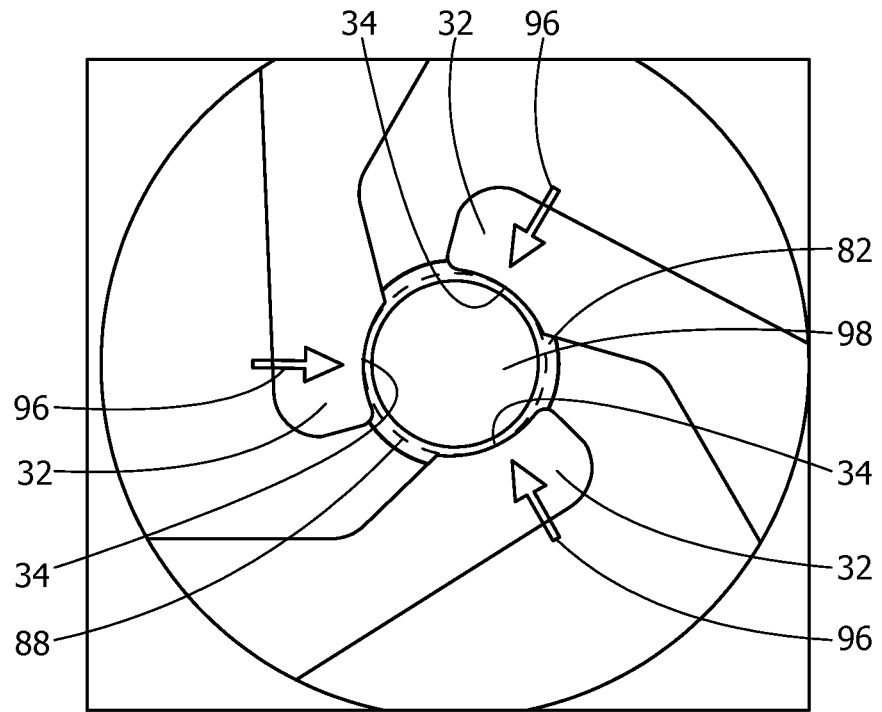
FIG. 11 is a diagrammatic view of the of insulation cutting blades shown partially cutting through the material of the inner insulation, the arrows indicated the radial motion of the insulation cutting blades.
Figure 12:
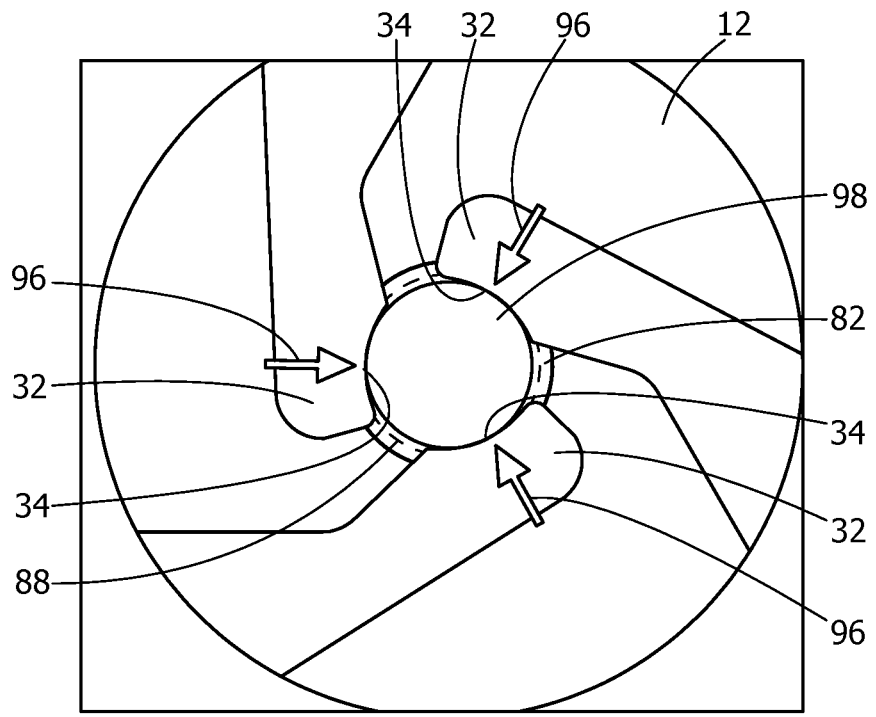
FIG. 12 is a diagrammatic view of the of insulation cutting blades shown fully cut through the material of the inner insulation, the arrows indicated the radial motion of the insulation cutting blades.

The blades 32 are then moved in a radial, or approximately radial, direction, as shown by arrows 96 in FIGS. 11 and 12. The radial movement of the blades 32 causes the blades 32 to move from the sixth position shown in FIG. 11 to a seventh position shown in FIG. 12, in which the blades 32 extend through the inner insulation 82. The insulation cutting blades 32 are moved from the sixth position to the seventh position by the first drive wheel mechanism 40. The tension created in the inner insulation 82 by the embedded blades 32 ensures that each radial movement or chop will cut the inner insulation 82, rather than only deforming the inner insulation 82. The radial cutting direction and the precise control of the blades 32 ensures that the components of the cable 60 below the blades 32, such as the braid conductors 98 are not cut. A single or multiple radial movement(s) or chop(s) may be used to cut through the inner insulation 82.

After a radial movement or chop, the blades 32 return to the depth of the sixth position. The insulation cutting blades 32 are moved from the seventh position to the sixth position by a coordinated movement of the first drive wheel mechanism 40 and the second drive wheel mechanism 42, in order to maintain the cutting blade depth at the sixth position during the rotation of the cutting blades 32. The blades 32 are then rotated by a pre-set amount, for example 30 degrees, before the next radial movement or chop. The insulation cutting blades 32 are rotated by the second drive wheel mechanism 42. The movement of the blades 32 ensures that any insulation that was left uncut between the adjacent contour blades 32 is completely cut. The blades 32 are again moved in a radial, or approximately radial, direction, as shown by arrows 96 in FIG. 11. The insulation cutting blades 32 are moved in the radial direction by the first drive wheel mechanism 40. The repeat radial movement of the blades 32 causes the blades 32 to move from the sixth position shown in FIG. 11 to the seventh position shown in FIG. 12, in which the blades 32 extend through the inner insulation 82, thereby cutting the inner insulation 82 of the cable 60. This is repeated until all of the insulation in line with the arcuate cutting surface 34 of the blades 32 along the circumference of the cable 60 is cut.

With the radial movement complete, the arcuate cutting surface 34 of the blades 32 are moved in the radial direction to a predetermined eighth position to prepare for the cut inner insulation 82 or inner insulation slug removal. The insulation cutting blades 32 are moved from the seventh position to the eighth position by the first drive wheel mechanism 40. In the eighth position, the blades 32 are spaced from the conductors 98 while keeping the arcuate cutting surface 34 of the blades 32 engaged with the inner insulation 82. The eighth position may be similar or different than the sixth position. The cable 60 is then moved in a direction parallel to the longitudinal axis of the cable 60 away from the arcuate cutting surface 34 of the blades 32 so that the blades 32 pull the cut insulation 82 from the cable 60. With the cut insulation 82 removed, the insulation cutting blades 32 are opened such that the arcuate cutting surfaces 34 do not engage the cable 60, thereby allowing the cable 60 to be moved relative to the insulation cutting blades 32 and the arcuate cutting surfaces 34 without contacting the arcuate cutting surfaces 34.

While the invention has been described with reference to a preferred embodiment, it will be understood by those skilled in the art that various changes may be made and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A method of removing insulation from an electrical cable, the method comprising:
   i) positioning the cable proximate an insulation cutting blade of a cable preparation apparatus;
   ii) moving a cutting surface of the insulation cutting blade in a rotary direction relative to the insulation of the cable;
   iii) engaging the insulation with the cutting surface of the insulation cutting blade as the insulation cutting blade is moved in the rotary direction;
   iv) cutting the insulation to a defined depth with the cutting surface of the insulation cutting blade as the insulation cutting blade is moved in the rotary direction, the defined depth being less than the thickness of the insulation;
   v) moving the cutting surface of insulation cutting blade in a radial direction relative to the insulation of the cable;
   vi) engaging the insulation with the cutting surface of the insulation cutting blade as the insulation cutting blade is moved in the radial direction;
   vii) cutting the insulation from the defined depth with the cutting surface of the insulation cutting blade as the insulation cutting blade is moved in the radial direction;
   viii) retracting the insulation blade to a predetermined distance;
   ix) rotating the insulation cutting blade by a pre-set amount;
   x) cutting the insulation from the defined depth with the cutting surface of the insulation cutting blade as the insulation cutting blade is moved in the radial direction;
   whereby the entire thickness of the insulation is cut by the combination of the movement of the insulation cutting blade in the rotary direction and the movement of the insulation cutting blade in the radial direction.

2. The method as recited in claim 1, wherein the cutting surface has an arcuate configuration.

3. The method as recited in claim 1, wherein the insulation cutting blade is initially moved to a first position in which the insulation cutting blade is proximate but does not engage the insulation of the cable.

4. The method as recited in claim 3, wherein as the cutting surface of the insulation cutting blade is moved in a rotary direction relative to the insulation of the cable, the cutting surface of the insulation cutting blade is moved toward the center of the cable to a second position which corresponds to the defined depth.

5. The method as recited in claim 4, wherein as the cutting surface of the insulation cutting blade is positioned in the second position, the movement of the insulation cutting blade in the rotary direction relative to the insulation of the cable is stopped.

6. The method as recited in claim 5, wherein the cutting surface of the insulation cutting blade remains embedded in the insulation and displaces insulation material, creating tension in the insulation in an area directly beneath the blade cutting surface of the insulation cutting blade.

7. The method as recited in claim 6, wherein with the area beneath the blade cutting surface of the insulation cutting blades in tension, the insulation cutting blade is moved the radial direction to a third position.

8. The method as recited in claim 7, wherein steps viii) through x) are repeated.

9. The method as recited in claim 7, wherein the cutting surface of the insulation cutting blade is moved in a radial direction to a fourth position to prepare for insulation slug removal.

10. The method as recited in claim 7, wherein the insulation is the outer insulation of the cable.

11. The method as recited in claim 7, wherein the insulation is the inner insulation of the cable.

12. A method of removing insulation from an electrical cable, the method comprising:
   i) positioning the cable between insulation cutting blades of a cable stripping or preparation apparatus;
   ii) cutting the insulation to a defined depth with cutting surfaces of the insulation cutting blades as the insulation cutting blades are moved in a rotary direction relative to the insulation of the cable, the defined depth being less than the thickness of the insulation;
   iii) maintaining the insulation cutting blades in the insulation to displace insulation material, creating tension in the insulation in areas directly beneath the blade cutting surfaces of the insulation cutting blades;
   iv) cutting the insulation from the defined depth with the cutting surfaces of the insulation cutting blades as the insulation cutting blades are moved in the radial direction;
   v) retracting the insulation blade by a predetermined distance;
   vi) rotating the insulation cutting blade by a pre-set amount;
   vii) cutting the insulation from the defined depth with the cutting surface of the insulation cutting blade as the insulation cutting blade is moved in the radial direction;
   whereby the entire thickness of the insulation is cut by the combination of the movement of the insulation cutting blades in the rotary direction and the movement of the insulation cutting blades in the radial direction.

13. The method as recited in claim 12, wherein the insulation cutting blades are initially moved to a first position in which the insulation cutting blades are proximate but do not engage the insulation of the cable.

14. The method as recited in claim 13, wherein as the cutting surfaces of the insulation cutting blades are moved in the rotary direction relative to the insulation of the cable, the cutting surfaces of the insulation cutting blades are moved toward the center of the cable to a second position which corresponds to the defined depth.

15. The method as recited in claim 14, wherein as the cutting surfaces of the insulation cutting blades are positioned in the second position, the movement of the insulation cutting blades in the rotary direction relative to the insulation of the cable is stopped.

16. The method as recited in claim 15, wherein with the areas beneath the blade cutting surfaces of the insulation cutting blades in tension, the insulation cutting blades are moved in the radial direction to a third position.

17. The method as recited in claim 16, wherein steps v) through vii) are repeated.

18. The method as recited in claim 16, wherein the cutting surfaces of the insulation cutting blades are moved in a radial direction to a fourth position to prepare for insulation slug removal.

\* \* \* \* \*